United States Patent
Duyvesteyn et al.

(10) Patent No.: US 6,440,383 B1
(45) Date of Patent: Aug. 27, 2002

(54) PROCESSING AQUEOUS TITANIUM CHLORIDE SOLUTIONS TO ULTRAFINE TITANIUM DIOXIDE

(75) Inventors: Willem P. C. Duyvesteyn, Reno; Timothy Malcome Spitler, Fernley; Bruce James Sabacky; Jan Prochazka, both of Reno, all of NV (US)

(73) Assignee: Altair Nanomaterials Inc., Reno, NV (US)

(*) Notice: Subject to any disclaimer, the term of this patent is extended or adjusted under 35 U.S.C. 154(b) by 0 days.

(21) Appl. No.: 09/503,365

(22) Filed: Feb. 14, 2000

Related U.S. Application Data (63) Continuation of application No. 09/500,207, filed on Feb. 7, 2000.
(60) Provisional application No. 60/141,057, filed on Jun. 24, 1999, and provisional application No. 60/141,114, filed on Jun. 24, 1999.

(51) Int. Cl.[7] .................. C01G 23/047; C01G 23/00
(52) U.S. Cl. .................. 423/611; 423/610; 423/612; 423/76
(58) Field of Search .................. 423/76, 610, 611, 423/612, 615, 616

(56) References Cited

U.S. PATENT DOCUMENTS

| | | |
|---|---|---|
| 3,903,239 A | 9/1975 | Berkovich |
| 3,935,094 A | 1/1976 | Bergeron et al. |
| 3,941,583 A | 3/1976 | Martin et al. |
| 3,961,005 A | 6/1976 | Sparks |
| 3,961,940 A | 6/1976 | Fukushima et al. |
| 3,966,455 A | 6/1976 | Taylor |
| 3,967,954 A | 7/1976 | Chen |
| 3,996,332 A | 12/1976 | Elger et al. |
| 4,012,338 A * | 3/1977 | Urwin .................. 252/461 |
| 4,065,544 A * | 12/1977 | Hamling et al. .......... 423/252 |

(List continued on next page.)

FOREIGN PATENT DOCUMENTS

| | | |
|---|---|---|
| DE | 197 25 616 C | 11/1998 |
| EP | 0 016 583 A | 10/1980 |
| EP | 0 186 370 A2 | 2/1986 |
| EP | 0 356 132 | 2/1990 |
| GB | 481892 | 3/1938 |
| GB | 497694 | 12/1938 |
| GB | 2 166 126 A | 4/1986 |
| WO | WO 95/08004 | 3/1995 |
| WO | WO 96/24555 | 8/1996 |
| WO | WO 97/10185 A | 3/1997 |
| WO | WO 97/30130 A | 8/1997 |

OTHER PUBLICATIONS

Patent Abstracts of Japan, vol. 007, No. 086 (C–161), Apr. 9, 1983 & JP 58 015031 A (Taijirou Okabe), Jan. 28, 1983 abstract.

Primary Examiner—Steven P. Griffin
Assistant Examiner—Cam N. Nguyen
(74) Attorney, Agent, or Firm—Brinks Hofer Gilson & Lione; G. Peter Nichols

(57) ABSTRACT

A hydrometallurgical process is provided for producing ultrafine or nano-sized titanium dioxide from titanium containing solutions, particularly titanium chloride solutions. The process is conducted by total evaporation of the solution, above the boiling point of the solution and below the temperature where there is significant crystal growth. Chemical control additives may be added to control particle size. Nano-sized elemental particles are formed after calcination. The titanium dioxide can be either anatase or rutile. Following calcination, the titanium dioxide is milled to liberate the elemental particles and provide a high quality nano-sized $TiO_2$ with a narrow particle size distribution.

34 Claims, 5 Drawing Sheets

U.S. PATENT DOCUMENTS

| | | | |
|---|---|---|---|
| 4,082,832 A | 4/1978 | Watanabe et al. | |
| 4,085,190 A | 4/1978 | Shiah | |
| 4,089,675 A | 5/1978 | Preston et al. | |
| 4,097,574 A | 6/1978 | Auger et al. | |
| 4,107,264 A | 8/1978 | Nagasubramanian et al. | |
| 4,120,694 A | 10/1978 | Elger et al. | |
| 4,152,252 A | 5/1979 | Tolley et al. | |
| 4,158,041 A | 6/1979 | Tolley | |
| 4,168,297 A | 9/1979 | Nagasubramanian et al. | |
| 4,172,878 A | 10/1979 | Tolley | |
| 4,174,274 A | 11/1979 | Tolley et al. | |
| 4,174,963 A | 11/1979 | Tolley | |
| 4,175,110 A | 11/1979 | Tolley | |
| 4,175,952 A | 11/1979 | Tolley | |
| 4,178,176 A | 12/1979 | Tolley | |
| 4,183,768 A | 1/1980 | Knapp et al. | |
| 4,199,552 A | 4/1980 | Rado | |
| 4,206,021 A | 6/1980 | Rivory | |
| 4,230,542 A | 10/1980 | Traini et al. | |
| 4,269,619 A | 5/1981 | Keil et al. | |
| 4,269,809 A | 5/1981 | Tolley et al. | |
| 4,288,417 A | 9/1981 | Rahm et al. | |
| 4,288,418 A | 9/1981 | Davis et al. | |
| 4,304,758 A | 12/1981 | Rieck et al. | |
| 4,313,913 A | 2/1982 | Panek et al. | |
| 4,359,449 A | 11/1982 | Hard et al. | |
| 4,384,883 A | 5/1983 | Fensom | |
| 4,389,391 A | 6/1983 | Dunn, Jr. | |
| 4,390,365 A | 6/1983 | Hard et al. | |
| 4,401,467 A | 8/1983 | Jordan | |
| 4,468,248 A | 8/1984 | Megy | |
| 4,842,832 A * | 6/1989 | Inoue et al. | 423/211 |
| 4,923,682 A * | 5/1990 | Roberts et al. | 423/611 |
| 4,944,936 A * | 7/1990 | Lawhorne | 423/612 |
| 4,986,742 A | 1/1991 | Denecker et al. | |
| 5,061,460 A | 10/1991 | Watanabe et al. | |
| 5,068,056 A * | 11/1991 | Robb | 252/313.1 |
| 5,068,093 A | 11/1991 | Mauer | |
| 5,104,445 A | 4/1992 | Dubrovsky et al. | |
| 5,106,489 A | 4/1992 | Schmidt et al. | |
| 5,135,652 A | 8/1992 | Boateng | |
| 5,192,443 A | 3/1993 | Delloye et al. | |
| 5,224,986 A | 7/1993 | Mostert et al. | |
| 5,225,178 A | 7/1993 | O'Donnell et al. | |
| 5,378,438 A | 1/1995 | Leary | |
| 5,397,375 A | 3/1995 | O'Donnell et al. | |
| 5,399,751 A | 3/1995 | Gentry et al. | |
| 5,427,749 A | 6/1995 | Hollitt et al. | |
| 5,441,712 A | 8/1995 | Duyvesteyn et al. | |
| 5,482,691 A | 1/1996 | O'Donnell et al. | |
| 5,490,976 A | 2/1996 | Rennie et al. | |
| 5,562,763 A * | 10/1996 | Bruckner et al. | 106/403 |
| 5,595,347 A | 1/1997 | Walpole | |
| 5,601,630 A | 2/1997 | Hoecker | |
| 5,679,131 A | 10/1997 | Obushenko | |
| 5,698,177 A * | 12/1997 | Pratsinis et al. | 423/613 |
| 5,698,205 A | 12/1997 | Brückner et al. | |
| 5,714,260 A * | 2/1998 | Okuda et al. | 428/402 |
| 5,730,774 A | 3/1998 | Hollitt et al. | |
| 5,730,795 A | 3/1998 | Herkimer | |
| 5,770,310 A * | 6/1998 | Noguchi et al. | 428/403 |
| 5,826,162 A | 10/1998 | Aral et al. | |
| 5,833,892 A | 11/1998 | Gurav et al. | |
| 5,840,111 A * | 11/1998 | Wiederhoft et al. | 106/436 |
| 6,001,326 A * | 12/1999 | Kim et al. | 423/598 |
| 6,037,289 A | 3/2000 | Chopin | |
| 6,099,634 A * | 8/2000 | Uenishi et al. | 106/436 |

* cited by examiner

PROCESSING AQUEOUS TITANIUM CHLORIDE SOLUTIONS TO ULTRAFINE TITANIUM DIOXIDE

This application claims priority from U.S. Ser. Nos. 60/141,057, 60/141,114, and is a continuation of U.S. application Ser. No. 09/500,207, filed Feb. 7, 2000, the entire contents of each are incorporated herein by reference.

The present invention relates to a process for producing-ultrafine or "nano-sized" titanium dioxide, parts of the process, and the product of the process. In particular, the present invention relates to the processing of aqueous titanium solutions to ultrafine titanium dioxide. The process includes a novel combination of operational steps to economically produce a high quality-ultrafine titanium dioxide.

BACKGROUND OF THE INVENTION

Titanium dioxide ($TiO_2$) for pigment use may be present in either of two predominant forms, anatase or rutile, and is used in paints, paper, plastics, ceramics, inks, etc. The titanium dioxide for pigment use generally has an average particle size of 150 to 250 nanometer and is considered the principal white pigment of commerce. It has an exceptionally high refractive index, negligible color, and is quite inert. Titanium dioxide having a smaller average particle size, for instance in the 10 to 100 nanometer median particle size range, is used commercially in cosmetics and personal care products, plastics, surface coatings, self-cleaning surfaces, and photovoltaic applications. This titanium dioxide is referred to as ultrafine or nano-sized titanium dioxide.

There are several processes for making ultrafine titanium dioxide, some in commercial use and some in development. Some use anhydrous titanium tetrachloride as a feedstock and burn it in an oxygen-hydrogen flame or in a plasma arc. Another process uses a titanyl sulfate solution as the feedstock. In this process, titanium dioxide is precipitated from the feedstock in a controlled manner, followed sequentially by calcination and intense steam micronization to break up agglomerates formed during the calcination step.

Both types of processes, however, suffer from a lack of control over the product particle size distribution, as well as the product mineralogy. In other words, although the average particle size of the titanium dioxide may be from 10 to 100 nanometer, the particle size distribution may vary greatly. Furthermore, the titanyl sulfate process produces an anatase form whereas the anhydrous chloride oxidation produces a rutile crystallographic modification. Therefore, there is a need for a process to economically make ultrafine titanium dioxide having a narrow particle size distribution and having a specific crystallographic modification made by an easily controlled, lower cost, environmentally sound route.

SUMMARY OF THE INVENTION

The present invention provides an economical hydrometallurgical process for producing ultrafine $TiO_2$ from aqueous titanium chloride solutions. The solutions may be derived from any of several sources, but are practically derived from processing mineral ores and, in particular, ilmenite ore or an ilmenite mineral concentrate. The processing to produce the solutions can be, for instance, a leaching or dissolution process, followed by any of several means for solution purification. The solution could also be produced by hydration of anhydrous titanium tetrachloride. The solution may also be derived from the process described in application No. 60/141,114 and from U.S. application Ser. No. 09/500,207, the entire contents of which are incorporated herein by reference.

The aqueous titanium chloride solution is generally comprised of water, hydrochloric acid, titanium oxychlorides and titanium chlorides. The solutions may vary widely in composition with respect to the hydrochloric acid content and the titanium content.

Minor quantities of any of several chemical control agents may be introduced into the solution. The solution is further converted to a titanium oxide solid in a process involving total, controlled evaporation of the solution and the formation of a thin film of titanium dioxide. This process is conducted above the boiling point of the solution and below the temperature where there is significant crystal growth. The water and hydrochloric acid are vaporized and the hydrochloric acid may be recovered.

The titanium oxide is next calcined at an elevated temperature to induce and control crystallization. The concentration and type of chemical control agent as well as the calcination conditions determine the desired crystalline form and crystal size of the ultrafine titanium dioxide.

Following calcination, the titanium dioxide is milled or dispersed to yield a final nano-sized or ultrafine titanium dioxide having a narrow particle size distribution.

The advantages of the process according to the present invention include a superior high quality ultrafine titanium dioxide due to the narrow particle size distribution and readily controlled physical and chemical characteristics, and low cost processing.

DETAILED DESCRIPTION OF THE INVENTION

Figure 1:
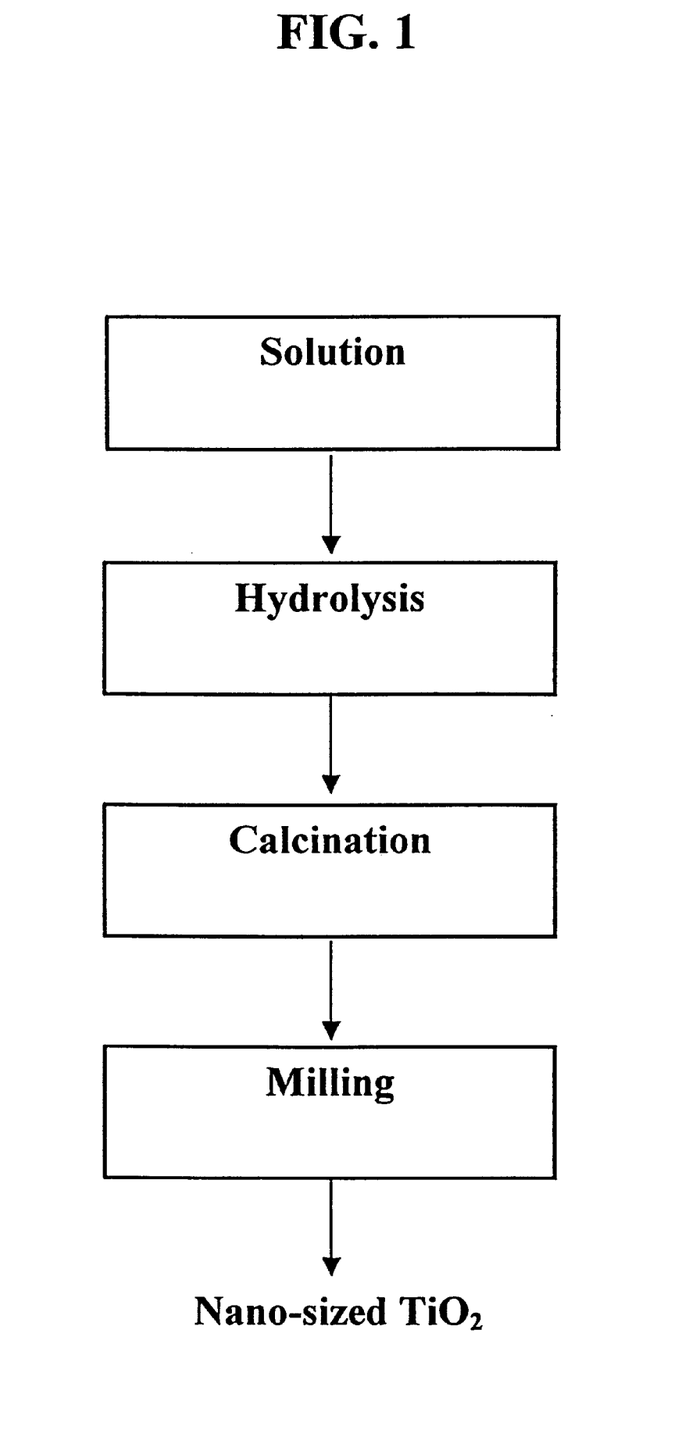
FIG. 1 is a flow sheet of the general aspect of the process according to the present invention.

The present invention is a hydrometallurgical process for producing ultra-fine or "nano-sized" grade $TiO_2$ from an aqueous titanium chloride solution. Such solutions may be derived from any of several sources including anhydrous titanium chloride, but are preferably derived from the processing of titaniferous ores using hydrochloric acid. Referring now to FIG. 1, the general process according to the present invention is shown.

Titanium Chloride Solutions

The aqueous titanium chloride solution is comprised of water, hydrochloric acid, titanium oxychlorides and titanium chlorides. The solution may vary widely in composition with the respect to the hydrochloric acid content and the titanium content. For example, the content of the feed solution may vary from about 3 wt. percent hydrochloric acid to as high as 40 wt. percent HCl and the titanium content may vary from as low as 30 grams of titanium per liter to as high as 200 grams titanium per liter.

The source of the titanium chloride solution may be from any known process in which chloride is used during the processing of titanium containing material. For example, the titanium chloride solution may be derived from the processing of titaniferous ores using hydrochloric acid. The solution may also be produced by hydration of anhydrous $TiCl_4$. Additionally, the source of the titanium chloride may be from those described in U.S. application Ser. Nos. 60/141,057 and 60/141,114, and U.S. patent application Ser. No. 09/500,207, the entire contents of which are incorporated herein by reference.

Minor quantities of chemical control agents may be introduced into the titanium chloride solution to control the physical and mineralogical characteristics of the solid titanium dioxide product resulting from the conversion of the solutions. These chemical control and seeding agents can be, but are not limited to, the chloride salts of sodium, potassium, aluminum, tin, and zinc. Carbonate, fluoride, sulfate and other suitable salts of the same aforementioned elements may be used. Additionally, phosphoric acid and phosphate salts of the aforementioned elements may be used. Furthermore, a number of organic additives may also be used. They include, but are not limited to: organic acids such oxalic, citric, stearic, etc.; salts from these organic acids and inorganic compounds; other organic additives, such as polyacrylates, glycols, siloxane and their compounds.

Vacuum Evaporation

Figure 2:
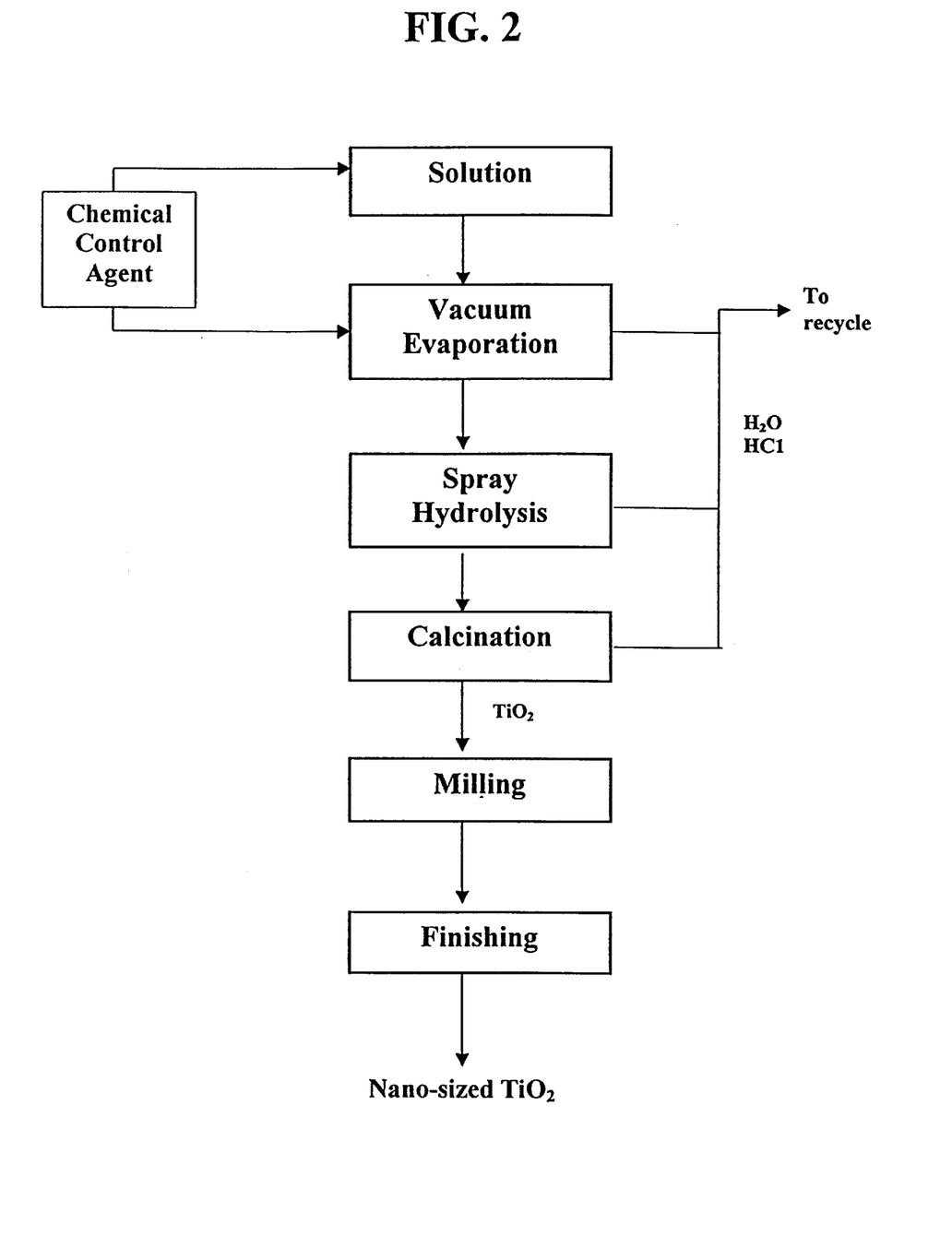
FIG. 2 is a flow sheet of one embodiment of the process according to the present invention, including vacuum evaporation and recycling of gases.

Optionally, the titanium chloride feed solutions to the process, before or after the chemical control and seeding agents are added, may be concentrated with respect to titanium content by any of several methods. A preferred method is by vacuum evaporation, as is shown in FIG. 2. The solutions can be vacuum evaporated under conditions to inhibit formation of titanium dioxide while removing excess water and HCl as vapors.

Hydrolysis

The titanium chloride solutions containing the chemical control agents are converted to a titanium oxide solid in a process involving total evaporation of the solution and the formation of a thin film of titanium dioxide. This process is conducted above the boiling point of the solution and below the temperature where there is significant crystallization. Water and hydrochloric acid gas are vaporized and the hydrochloric acid may be recovered by any known process.

The evaporation, hydrolysis and drying are performed in a manner to control the physical form of the product oxide. Preferably, hydrolysis is accomplished by spraying the solution while it is heated at a temperature in the range form about 120° C. to about 350° C., and most preferably in the range from about 200° C. to about 250° C. This process is called spray hydrolysis. Spray hydrolysis may be effected in a spray dryer.

Through control of the operating parameters, including temperature and chemical composition of the feed solutions to the spray hydrolysis operation, the resulting physical and chemical characteristics of the solid titanium product can be reliably controlled within a fairly narrow range. For example, the titanium oxide resulting from spray hydrolysis in a spray dryer will be composed of hollow, thin-filmed spheres or parts of spheres. The dimensions of the spheres may vary over a wide range, from less than 1 μm to 100 μm or more in diameter, and a shell thickness in the range from about 30 nanometer to about 1000 nanometer or more. The structure of the shell consists of an amorphous, hydrated, polymeric titanium oxide containing some residual chloride.

Without being bound by any theory, it is believed that spray hydrolysis in the given conditions yields spheres composed of a thin film of an amorphous solid that can readily be converted to nano-sized rutile, nano-sized anatase titanium dioxide, or mixtures thereof, depending on the types of chemical controls introduced in the titanium chloride feed solutions and on the physical parameters used in the spray hydrolysis operation. Spray hydrolysis also has the advantage of direct processing of the solution so that the formation of titanium dioxide and evaporation of water and HCl are simultaneously accomplished.

Calcination

The titanium oxide product resulting from the spray hydrolysis operation is calcined at a temperature and for a length of time sufficient to convert the amorphous oxide to titanium dioxide of the desired crystal structure, namely ultrafine titanium dioxide. The temperature is low enough and the time is sufficiently short to limit excessive crystal growth. Calcination temperatures can range between about 450° C. to over 1100° C. Preferably, the calcination is conducted at temperatures ranging from about 600° C. to about 900° C. The calcination time also varies over a wide range, from about 20 minutes to as long as 80 hours. Preferably, the calcination time is in the range from about 30 minutes to about 8 hours. Lower temperatures will require longer calcination times. The product of calcination is a thin film showing a structure of individual units that can be broken up by milling into particles of the desired median size and size distribution.

During calcination, any residual chloride in the amorphous oxide feed is expelled as HCl gas, which can be recovered.

Additionally and optionally, chemical control agents may be added to the amorphous oxide just prior to calcination to promote and control conversion of the oxide to the desired crystal structure and other physical characteristics such as crystal size and millability. These chemical control agents can be but are not limited to the chloride salts of sodium, potassium, aluminum, tin, and zinc. Carbonate, fluoride, sulfate and other suitable salts of the same aforementioned elements may be used. Additionally, phosphoric acid and phosphate salts of the aforementioned elements may be used.

Milling and Finishing

After calcination, the titanium dioxide consists of more than 99.5% of either ultrafine ("nano-sized") anatase or ultrafine ("nano-sized") rutile, depending on the conditions and chemical control agents used in spray hydrolysis and calcination. After calcination, the titanium dioxide is milled and dispersed to break up the thin film into individual particles. Finishing steps may be added as required.

The following examples illustrate, but do not limit, the present invention. Unless otherwise indicated, all parts and percentages are by weight.

EXAMPLE 1

A solution containing 30 g/l Ti and 210 g/l Cl was made according to the process described in U.S. patent application Ser. No. 60/141,114. Phosphoric acid was added in an amount equal to 0.08 wt-% of the amount of solution. The solution was fed to a spray dryer, consisting of a reaction chamber followed by bag filters and an HCl absorption system. The solution was injected at a rate of 2.25 liters/min through an atomizing disk. Gases from the combustion of natural gas, diluted with air to 550° C. were also injected around the disk. The outlet temperature was 250° C., and the total gas flow rate was about 800 scfm. Reactor off gasses were sent to a bag filter to collect the $TiO_2$ product. The recovered product was further calcined at 920° C. for 1 hour.

Scanning electron micrographs of the product after calcination show spheres with an elemental particle size of the order of 50 nanometer and a film thickness of the order of 1000 nanometer.

EXAMPLE 2

A solution containing 30 g/l Ti and 136 g/l Cl was made by dissolving anhydrous liquid $TiCl_4$ in 3 M HCl and further diluting with water to reach to required titanium concentration. Phosphoric acid was added in an amount equal to 0.16% of the weight of solution. The solution was fed to a spray dryer under the same conditions as those mentioned in Example 1. The product recovered on the bag filter was calcined at 800° C. for 6 hours.

Figure 3:
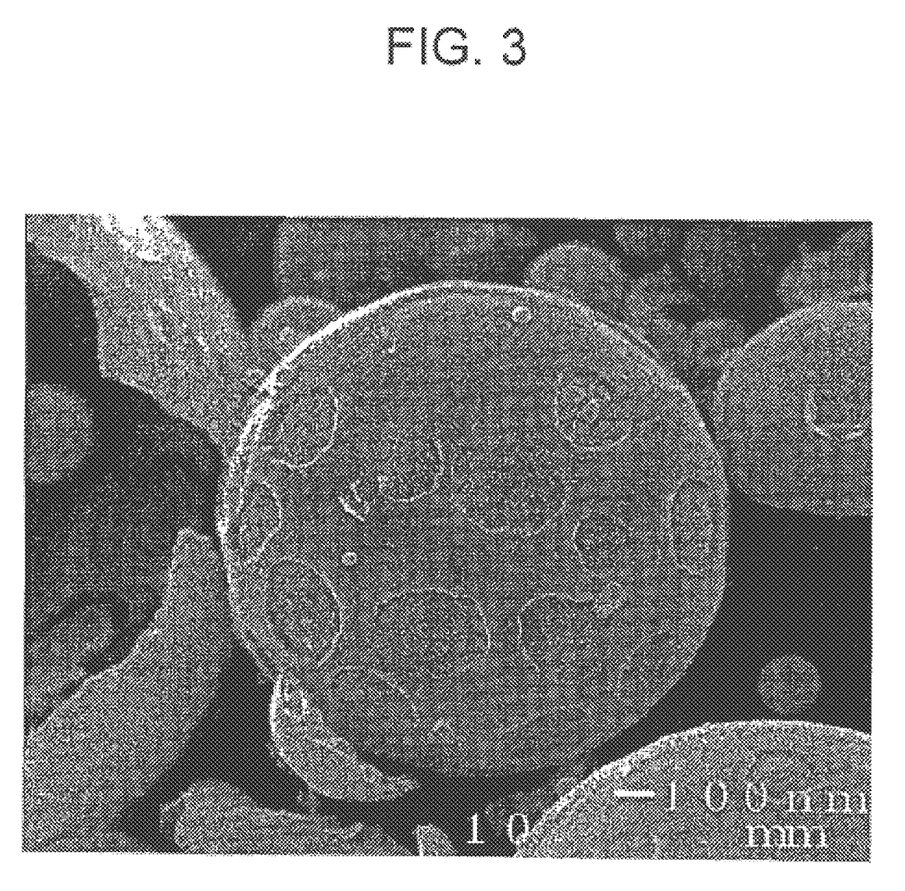
FIG. 3 is a scanning electron micrograph of a spherical particle of unmilled nano-sized titanium dioxide produced according to the method of the present invention and which is magnified 70,000 fold. An amount of 0.16% phosphoric acid was added to the solution as a chemical control.
Figure 4:
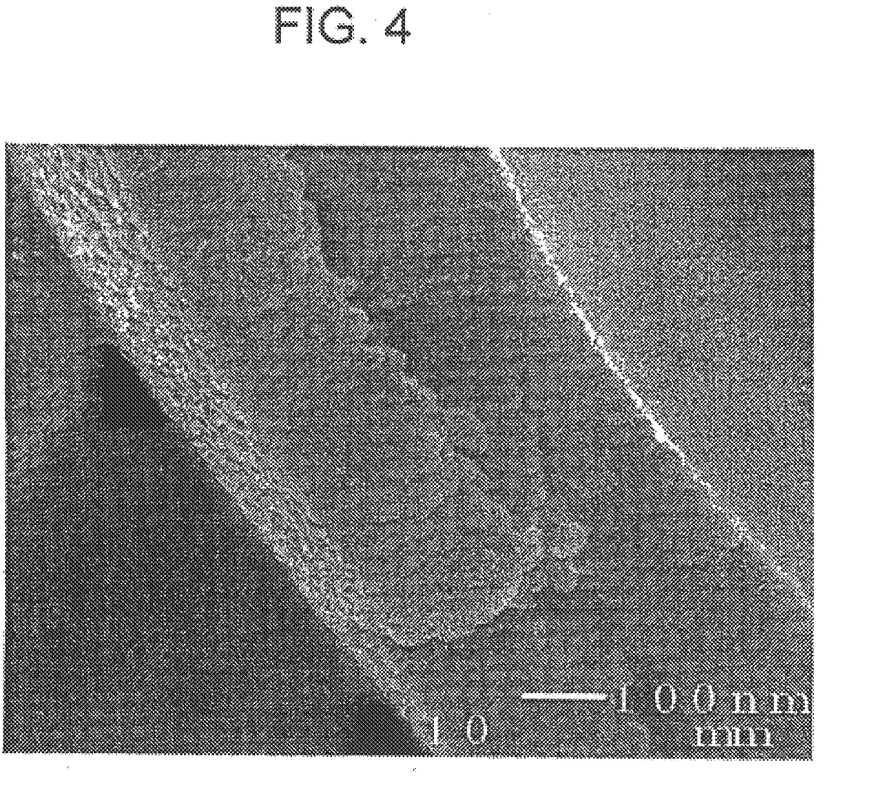
FIG. 4 is a scanning electron micrograph showing the cross-section of a shell of the material depicted in FIG. 3. It is magnified 140,000 fold.

FIG. 3 is a scanning electron micrograph of the calcined product magnified 70,000 fold. The diameter of the particle shown is about 1.2 $\mu$m. FIG. 4 is a scanning electron micrograph of the same product, showing the edge of a shell. The shell thickness is about 350 nm and elemental particles have a size of about 40 nm. The product is subsequently milled to liberate the individual particles. The milled product has a specific surface area measured by the BET method of 33 $m^2$/gram.

EXAMPLE 3

In the same solution used in Example 2, phosphoric acid was added in an amount equal to 0.32% of the weight of solution. The solution was fed to a spray dryer and the product was calcined under the same conditions as those mentioned in Example 1.

Figure 5:
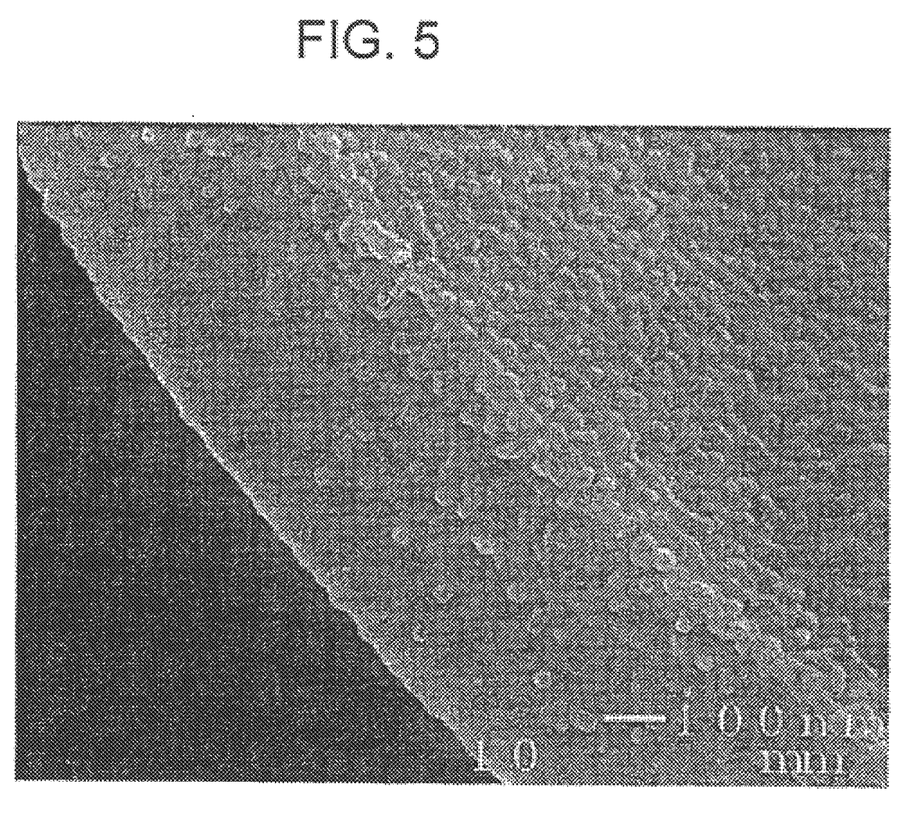
FIG. 5 is a scanning electron micrograph of unmilled nano-sized titanium dioxide produced according to the method of the present invention and which is magnified 100,000 fold. An amount of 0.32% phosphoric acid was added as a chemical control.

FIG. 5 is a scanning electron micrograph, magnified 100,000 fold, of the section of a shell after calcination. Individual particles are about 30 nanometer in diameter. The shell thickness is about 400 nm. The product is subsequently milled to liberate the individual particles. The specific surface area of the milled product as measured by the BET method is 43 $m^2$/gram.

EXAMPLE 4

A weight of oxalic acid equal to 1% of the amount of solution was added to a solution of Ti chloride in hydrochloric acid containing 50 g/l Ti and 230 g/l total chloride. The solution was fed to a spray hydrolyzer under the same conditions as those given in Example 3. While the product after spray hydrolysis had a brown-gray-buff color, due to the presence of some organic residue, the subsequent calcination step reduced the residual carbon content to very low levels as the calcined product had a pure white appearance. The conditions of calcination were the same as those mentioned in Example 3. The calcined product showed a structure of relatively large rutile crystals that were more easily millable than those of the previous example. After milling in a media mill, a product with a median particle size of 50 nm was obtained.

While there have been described what are presently believed to be the preferred embodiments of the invention, those skilled in the art will realize that changes and modifications may be made thereto without departing from the spirit of the invention. It is intended to claim all such changes and modifications that fall within the true scope of the invention.

What is claimed is:

1. A process for producing ultrafine titanium dioxide from a titanium chloride solution comprising:
   a. adding a chemical control agent to the titanium chloride solution to form a feed solution;
   b. hydrolyzing the feed solution to form titanium oxide particles in a controlled temperature, evaporation process at a temperature higher than the boiling point of the solution but lower than the temperature where crystallization becomes significant;
   c. calcining the hydrolyzed product to form titanium dioxide; and,
   d. milling the calcined product to liberate elemental nano-sized particles.

2. The process of claim 1 wherein the hydrolyzing step successively evaporates part of the solution, hydrolyzes the titanium in solution to form $TiO_2$, and evaporates the remainder of the solution.

3. The process of claim 1 wherein during the hydrolyzing step, hydrochloric acid is formed and water is removed.

4. The process of claim 3 wherein the hydrochloric acid and water are recovered.

5. The process of claim 4 wherein the spray dryer temperature is between about 200° C. and about 250° C.

6. The process of claim 1 wherein the hydrolyzing is effected by a spray dryer.

7. The process of claim 6 wherein the spray dryer temperature is between about 120° C. and about 350° C.

8. The process of claim 1 wherein the chemical control agent is selected from the group consisting of metal salts and acids comprising metal chloride, metal fluoride, metal sulfate, metal carbonate, metal phosphate, phosphoric acid, and mixtures thereof.

9. The process of claim 1 wherein the chemical control agent is selected from the group consisting of polyacrylates, glycols, siloxanes, organic acids, lithium, sodium, potassium, and ammonium salts of the organic acids comprising oxalic acid, citric acid and stearic acid and mixtures thereof.

10. The process of claim 1 wherein the chemical control agent is selected from the group consisting of metal salts comprising chloride, carbonate, fluoride, sulfate, and phosphate of sodium, potassium, aluminum, tin, zinc, and mixtures thereof.

11. The process of claim 1 where a thin film of amorphous titanium oxide is formed during the hydrolysis process.

12. The process of claim 11 wherein the amorphous titanium oxide comprises thin film membrane hollow spheres or parts of spheres having a diameter of between about 1 and about 100 $\mu$m and a membrane thickness of between about 30 nanometer and about 1000 nanometer.

13. The process of claim 11 wherein the amorphous titanium oxide comprises hollow spheres or parts of spheres.

14. The process of claim 13 wherein the spheres or parts of spheres have a diameter of about 1 to about 100 $\mu$m.

15. The process of claim 11 wherein the thin film has a thickness of about 30 nanometer to about 1000 nanometer.

16. The process of claim 1 wherein the feed solution is first concentrated by vacuum evaporation under conditions to avoid hydrolysis of the titanium chloride.

17. The process of claim 1 wherein the calcining is conducted at a temperature between about 450° C. and about 1100° C.

18. The process of claim 1 wherein the calcining is conducted at a temperature between about 600° C. and about 900° C.

19. A process for producing ultrafine titanium dioxide having a particle size less than about 100 nanometer from an aqueous titanium chloride solution comprising:
   a. adding a chemical control agent to the titanium chloride solution to form a feed solution;
   b. hydrolyzing the feed solution to form titanium oxide particles in a controlled temperature, evaporation process at a temperature higher than the boiling point of the solution but lower than the calcination temperature of the product;
   c. calcining the hydrolyzed product to form titanium dioxide; and,
   d. milling the calcined product to liberate elemental nano-sized particles.

20. The process of claim 19 wherein the hydrolyzing step successively evaporates part of the solution, hydrolyzes the titanium in solution to form $TiO_2$, and evaporates the remainder of the solution.

21. The process of claim 19 wherein the hydrolyzing step includes forming hydrochloric acid and removing water.

22. The process of claim 21 wherein the hydrochloric acid and water are recovered.

23. The process of claim 19 wherein the hydrolyzing is effected by a spray dryer.

24. The process of claim 23 wherein the spray dryer temperature is between about 120° C. and about 350° C.

25. The process of claim 23 wherein the spray dryer temperature is between about 200° C. and about 250° C.

26. The process of claim 19 wherein the chemical control agent is selected from the group consisting of metal salts and acids comprising metal chloride, metal fluoride, metal sulfate, metal carbonate, metal phosphate, phosphoric acid, and mixtures thereof.

27. The process of claim 19 wherein the chemical control agent is selected from the group consisting of metal salts comprising chloride, carbonate, fluoride, sulfate, and phosphate of sodium, potassium, aluminum, tin, zinc, and mixtures thereof.

28. The process of claim 19 wherein the chemical control agent is selected from the group consisting of organic acids selected from the group consisting of oxalic, citric, stearic, a lithium, sodium, potassium, or ammonium salt of these organic acids, polyacrylates, glycols, siloxanes, and mixtures thereof.

29. The process of claim 19 where a thin film of amorphous titanium oxide is formed during the hydrolysis step.

30. The process of claim 29 wherein the amorphous titanium oxide comprises hollow spheres or parts of spheres having a diameter of between about 1 and about 100 $\mu$m and a membrane thickness of between about 30 nanometer and about 1000 nanometer.

31. The process of claim 19 wherein the feed solution is concentrated by vacuum evaporation under conditions to avoid hydrolysis of the titanium chloride.

32. The process of claim 19 wherein the calcining is conducted at a temperature between about 450° C. and about 1100° C.

33. The process of claim 19 wherein the calcining is conducted at a temperature between about 600° C. and about 900° C.

34. The process of claim 19 wherein the average diameter of the titanium dioxide is between about 10 and about 60 nanometer.

* * * * *